(12) United States Patent
Liu

(10) Patent No.: US 6,731,485 B2
(45) Date of Patent: May 4, 2004

(54) DIGITAL POWER INVERTER

(75) Inventor: Hong-Shung Liu, Taipei Hsien (TW)

(73) Assignee: Long Well Electronics Corp., Taipei Hsien (TW)

( * ) Notice: Subject to any disclaimer, the term of this patent is extended or adjusted under 35 U.S.C. 154(b) by 69 days.

(21) Appl. No.: 10/153,671

(22) Filed: May 24, 2002

(65) Prior Publication Data

US 2003/0218837 A1 Nov. 27, 2003

(51) Int. Cl.⁷ .................................. H02H 3/20
(52) U.S. Cl. ............................ 361/90; 361/86
(58) Field of Search ..................... 361/86, 90, 93.9, 361/93.8, 92, 93.7, 94, 106

(56) References Cited

U.S. PATENT DOCUMENTS 4,787,007 A  * 11/1988 Matsumura et al. .......... 361/98

* cited by examiner

Primary Examiner—Brian Sircus
Assistant Examiner—Isabel Rodriguez
(74) Attorney, Agent, or Firm—Troxell Law Office PLLC

(57) ABSTRACT

A digital electric power inverter comprising: a CPU, a PWM driving circuit, a PWM converting circuit, a rectifying circuit, an AC driving circuit, a DC/AC inverting circuit, an overload detecting circuit and an alarm circuit, the power inverter is characterized by that: the entire circuitry of the electric power inverter is designed to be controlled by the CPU that can accurately control these circuits to get an ability of high driving outputting.

2 Claims, 6 Drawing Sheets

DIGITAL POWER INVERTER

BACKGROUND OF THE INVENTION

1. Field of the Invention

The present invention is related to a digital electric power inverter, and especially to a DC to AC power inverter particularly suitable to be used as a protection circuit module structure to control and protect the elements of the power inverter from being damaged and to be able to provide actuating power for a machine.

2. Description of the Prior Art

A conventional electric power inverter is comprised of a plurality of IC's, when one of the IC's is lacking, a similar IC shall be changed for it, this will make the entire performance of working influenced, and can increase difficulty of designing. The inferiority in designing thereof for overload protection is shown in FIG. 1; to satisfy the requirement for activating a heavy tool machine in the markets, huge electric power is required, if such a machine is to be actuated, several folds of monetary amount must be paid to purchase an electric power inverter with several folds of functional specification for actuating a small machine.

For example, a sand wheel needs 200W for running, while the transient power for actuating is over 1000W; therefore, in using such a machine, an electric power inverter of 1000W must be purchased. The reason is that, a conventional electric power inverter triggers a protecting loop to shut outputting in corresponding to the detecting signal from a detecting loop when the output terminal is given a heavy load, to thereby protect the interior electronic elements; this is because that conventional designing has to trigger a protecting line according to the detecting of the output state to turn off the system to protect the product. And this is the defect of the conventional design.

Therefore, the motive of the present invention is to improve the conventional electric power inverters to get rid of the above stated defects, and to provide a digital electric power inverter which sufficiently uses the control character of a CPU (a microcomputer). Thereby, the CPU turns off output in time before the output power makes the elements damaged, in order that the elements can restore their functions; a short time after restoration, the CPU turns on output again, till it once more turns off before the elements are crumbled. The process is repeated again and again to accumulate the low power outputs made in many times to get the required high actuating power for a load.

SUMMARY OF THE INVENTION

The primary object of the present invention is to provide an intermittently actuated digital electric power inverter that can gradually supply step by step the required actuating transient power output.

To achieve the above stated object, the present invention is comprised of a CPU, a PWM driving circuit, a PWM converting circuit, a rectifying circuit, an AC driving circuit, a DC/AC inverting circuit, an overload detecting circuit and an alarm circuit. The present invention is characterized by that: the entire circuitry thereof is designed to be controlled by the CPU that can accurately control these circuits to get an ability of high driving outputting.

The present invention will be apparent in its construction and other features after reading the detailed description of the preferred embodiment thereof in reference to the accompanying drawings.

DETAILED DESCRIPTION OF THE PREFERRED EMBODIMENT

Figure 3:
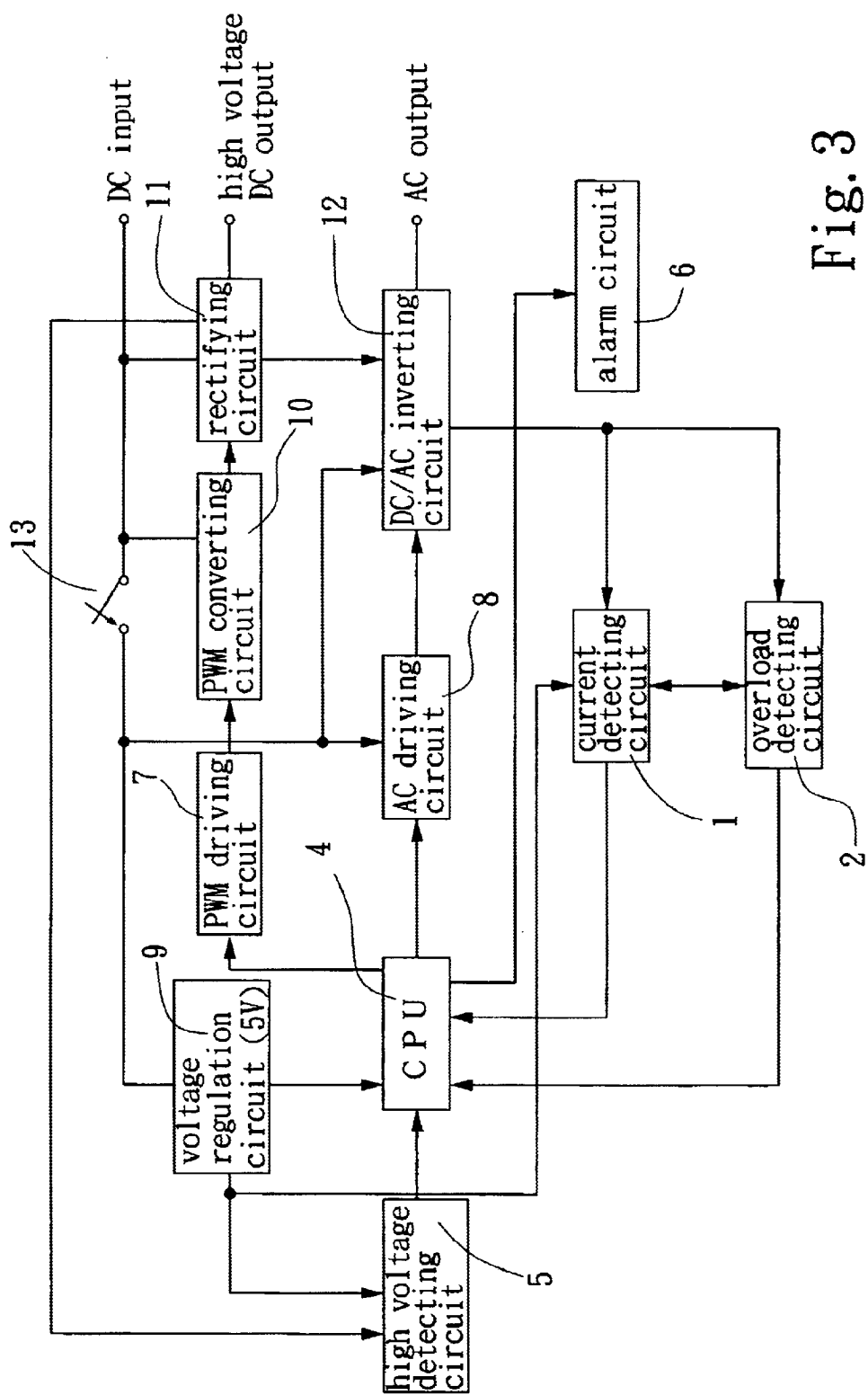
FIG. 3 is an electric block diagram showing of the present invention.
Figure 4:
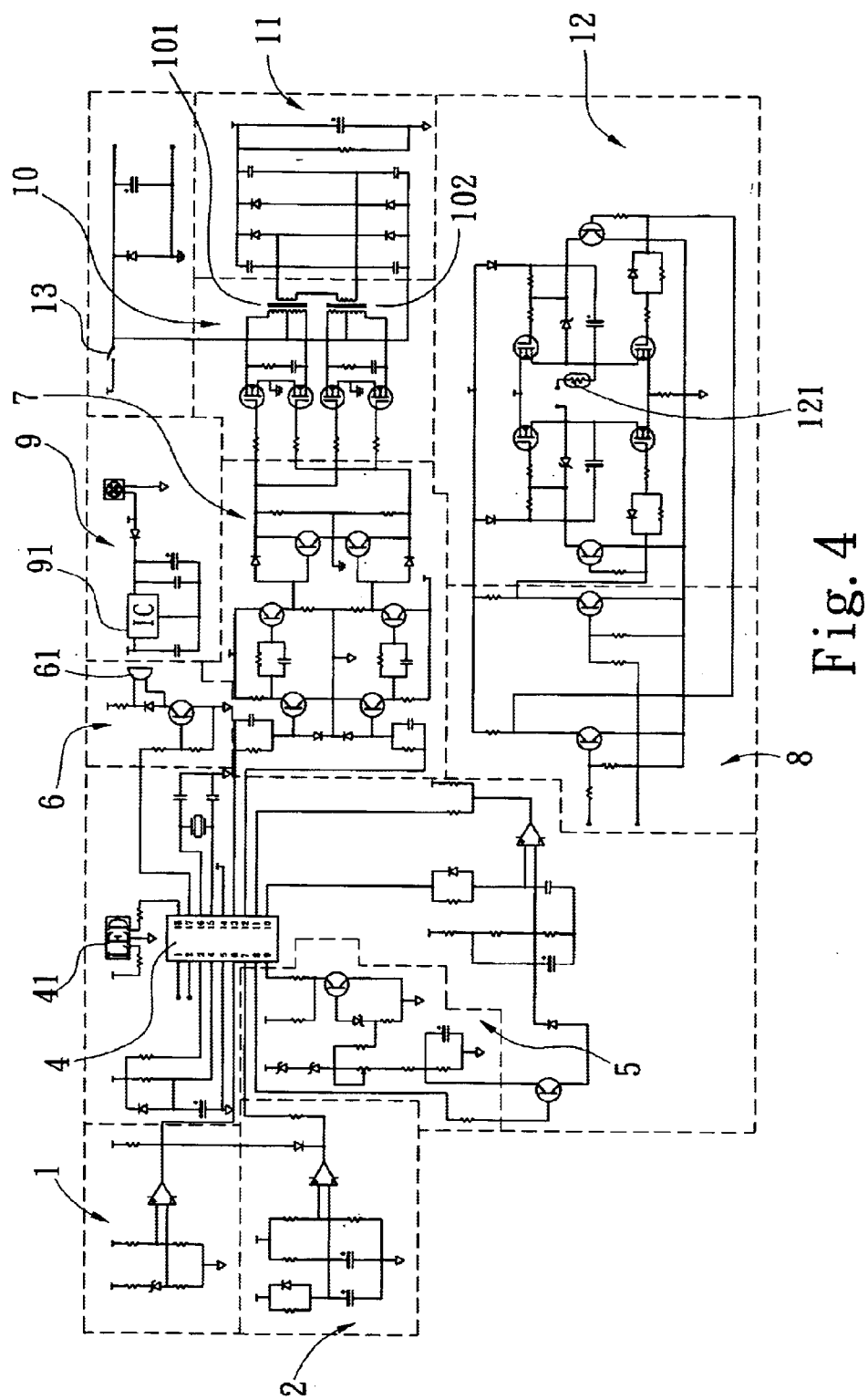
FIG. 4 shows the entire electric circuitry of the present invention.
Figure 5:
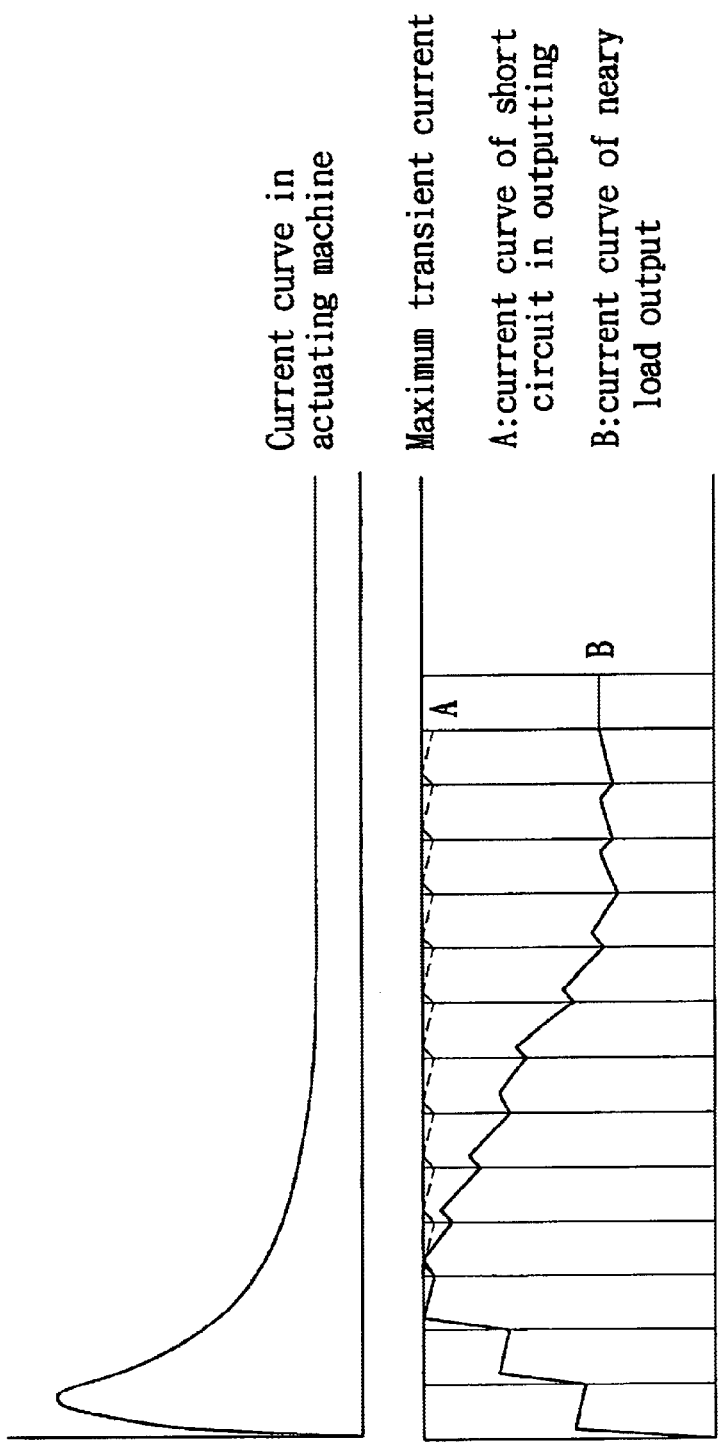
FIG. 5 is an output current curve diagram of the present invention.
Figure 6:
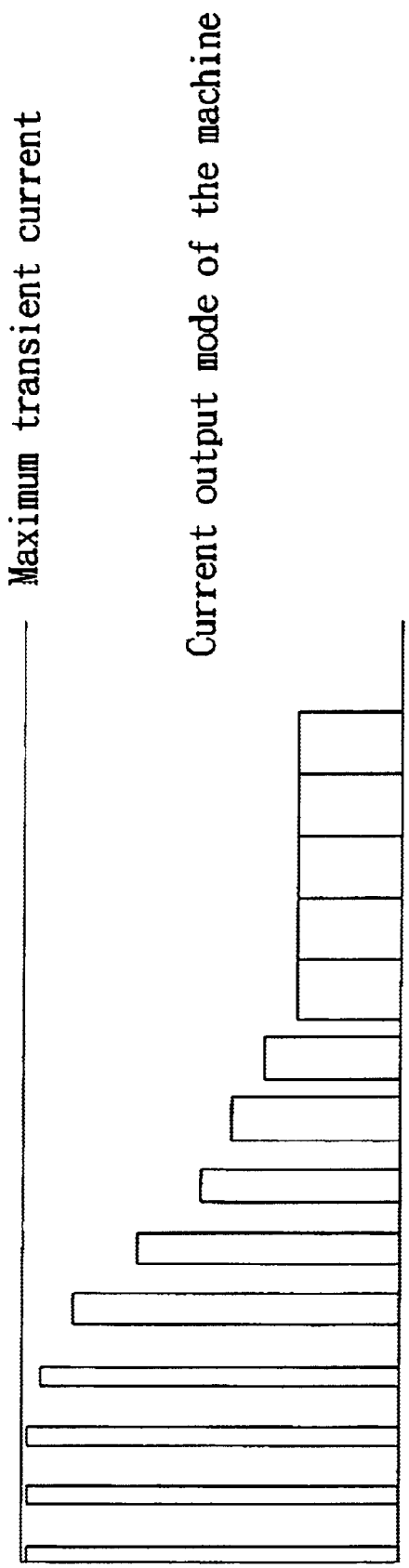
FIG. 6 is a diagram showing the mode of current output of the present invention.

Referring firstly to FIGS. 3 and 4, the present invention is comprised of an overload detecting circuit 2, a CPU 4, a high voltage detecting circuit 5, an alarm circuit 6, a PWM driving circuit 7, an AC driving circuit 8, a voltage regulation circuit (5V) 9, a PWM converting circuit 10, a rectifying circuit 11, a DC/AC inverting circuit 12 and a switch 13.

Wherein, the voltage regulation circuit 9 is provided for power supplying for normal operation of the entire circuitry of the power inverter; the CPU 4 is provide for connecting all the detecting circuits; the overload detecting circuit 2 is connected with one end thereof to the DC/AC inverting circuit 12, and with another end thereof to the CPU 4; the high voltage detecting circuit 5 is connected with one end thereof to the rectifying circuit 11, and with another end thereof to the CPU 4; the alarm circuit 6 is directly connected with the CPU 4; the PWM driving circuit 7 is connected with one end thereof to the CPU 4, with another end thereof to a PWM converting circuit 10; the AC driving circuit 8 is connected with one end thereof to the CPU 4, with another end thereof to the DC/AC inverting circuit 12; the PWM converting circuit 10 is connected with one end thereof to the PWM driving circuit 7, with another end thereof to the rectifying circuit 11; the rectifying circuit 11 is connected with one end thereof to the PWM converting circuit 10, with another end thereof to the DC/AC inverting circuit 12, it has a high voltage AC output connecting point; the DC/AC inverting circuit 12 connected with the AC driving circuit 8 and the rectifying circuit 11, the other end thereof is connected with the overload detecting circuit 2, it further has an AC output connecting point.

Thereby, the CPU 4 controls by cooperation the working of the overload detecting circuit 2, it turns off output in time before the output power makes the elements damaged, a short time after restoration, the CPU 4 turns on output again. The process is repeated again and again intermittently to protect the elements from being damaged, and the normal working power for a machine load can be afforded, the larger actuating power for the machine can be provided.

And the more detailed combination and functions of present invention are as follows:

The overload detecting circuit 2 is comprised of an operation amplifier (OPA), a plurality of diodes, resistances and capacitors; it is provided for detecting whether it is overloading and whether the input DC voltage is overly high or overly low;

the CPU 4 includes a transistor, a plurality of resistances and capacitors, a diode, an operation amplifier (OPA)

and an LED 41 composing a microcomputer control loop, in order to provide signals for the PWM driving circuit 7 and the AC driving circuit 8;

the high voltage detecting circuit 5 is comprised of a plurality of transistors, Zener diodes, resistances, a variable resistance and a plurality of capacitors; it is provided for detecting a high voltage state;

the alarm circuit 6 is comprised of a transistor, a plurality of diodes and resistances, and a buzzer 61; it is provided for detecting an abnormal state of the circuitry to provide an alarm;

the PWM driving circuit 7 is comprised of a plurality of transistors, diodes, resistances and capacitors; it is provided for amplifying and reshaping the output PWM signals output from the CPU 4;

the AC driving circuit 8 is comprised of a plurality of transistors and resistances; it is provided for amplifying the output AC driving signals of the CPU 4;

the voltage regulation circuit 9 is comprised of a voltage regulation IC 91, a plurality of diodes and capacitors;

the PWM converting circuit 10 is comprised of a plurality of FET power transistors, resistances, capacitors and two transformers 101, 102; it is directly supplied with electric power in the mode of DC inputting, and is provided for increasing the voltage of the driving signals amplified and reshaped by the PWM driving circuit 7 through the transformers to generate high frequency AC signals;

the rectifying circuit 11 is comprised of a plurality of diodes capacitors and resistances; it is directly supplied with electric power in the mode of DC inputting, and is provided for rectifying the high frequency AC signals generated by the PWM converting circuit 10 to generate an AC high voltage;

the DC/AC inverting circuit 12 is comprised of a plurality of transistors, FET power transistors, diodes, Zener diodes, resistances, capacitors and a heat sensitive resistance; it is provided for converting DC high voltage signals provided by the AC driving circuit 8 into an AC high voltage output.

The above stated circuitry assembled can make the present invention execute the following actions when the switch 13 is closed to actuate the CPU 4:

1. The CPU 4 renders the PWM (pulse wide modulation) driving circuit 7 to generate, amplify and reshape signals, the signals amplified and reshaped are increased in voltage by the transformers 101, 102 of the PWM converting circuit 10, the high frequency AC signals generated after increasing of voltage is rectified by the rectifying circuit 11 to get an AC high voltage.
2. The CPU 4 renders the AC driving circuit 8 to generate and amplify signals, the signals amplified renders the DC/AC inverting circuit 12 to convert DC high voltage into AC high voltage to generate an AC output.
3. The DC/AC inverting circuit 12 provides a current signal which is sent to the overload detecting circuit 2; the detecting state is sent back to the CPU 4 for analysis and judgment, if it is judged abnormal, the CPU 4 immediately adjust the PWM driving circuit 7 and the AC driving circuit 8 to protect the elements from being damaged.
4. The high voltage detecting circuit 5 detects a high voltage state and sends the state back to the CPU 4 which executes suitable modulation for the abnormal potential state to make the power supplying state normal.

Figure 1:
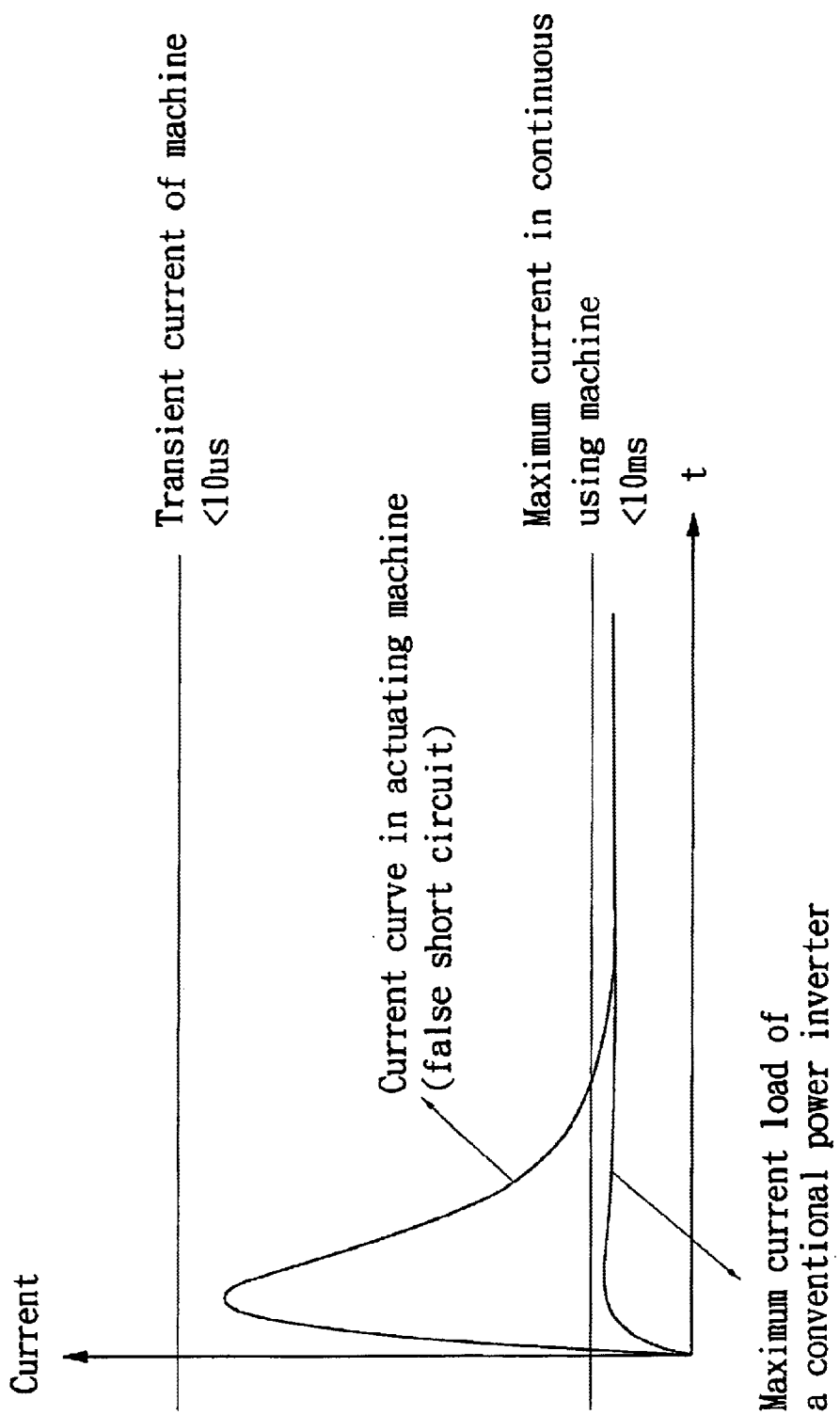
FIG. 1 is a drawing of a current vs. time coordinate showing that a conventional power inverter is unable to satisfy the requirement of a transient current supply.
Figure 2:
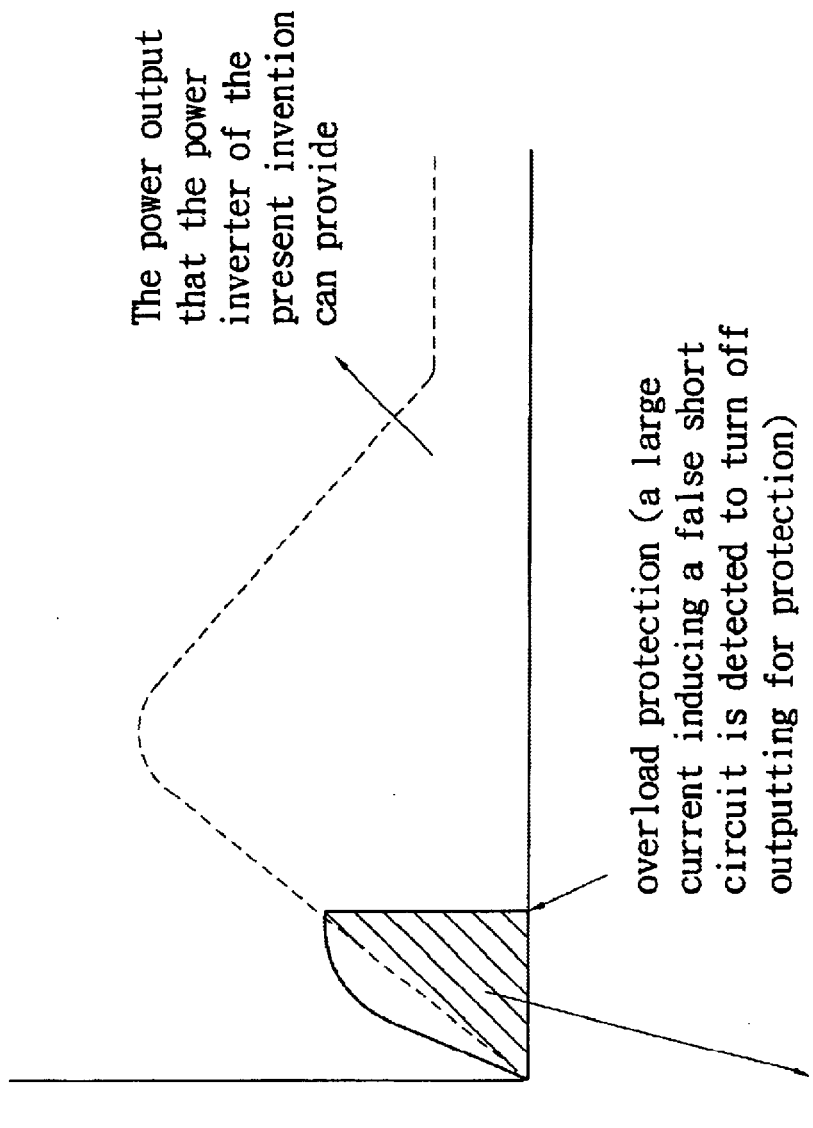
FIG. 2 is a drawing showing comparison of power outputs between the conventional power inverter and the present invention.

Referring to FIGS. 2, 4, the present invention sufficiently utilizes the characteristic of the CPU 4, thereby, when a machine with the actuating transient power of more than 200W is actuated (such as a sand wheel machine with the actuating transient power of more than 1000W), the present invention nonetheless provides a load with an output power, but the CPU 4 turns off output in time within the tolerated scope of safety before the output power makes the elements damaged, in order that the elements can restore their functions, a short time after restoration, the CPU 4 turns on output again, till it once more turns off before the elements are damaged. The process is repeated again and again to protect the elements from being damaged, and the actuating power for a machine can be provided. Therefore, although this is not able to provide all the power to transiently afford the machine requirement, it can gradually supply step by step the required actuating power. In view of this, this mode of operation can provide a 200W electric power inverter for actuating a 200W sand wheel machine, it does not require a 1000W electric power inverter for actuating as is the case of a conventional power inverter.

In conclusion, the present invention can surely obtain the object stated above after one reviewing the content disclosed hereinbefore, it thereby provides the digital power inverter that can gradually supply step by step the required actuating transient power output. Having thus described the present invention with practicability, what I claim as new and desire to be secured by Letters Patent of the United States are:

What is claimed is:

1. A digital electric power inverter comprising:

an overload detecting circuit connected with one end thereof to a DC/AC inverting circuit and with another end thereof to a CPU;

said CPU connected with all said detecting circuits to provide signals for an AC driving circuit and a PWM driving circuit;

a high voltage detecting circuit connected with one end thereof to a rectifying circuit and with another end thereof to said CPU;

an alarm circuit directly connected with said CPU for detecting an abnormal state of the circuitry of said power inverter to provide an alarm;

said PWM driving circuit connected with one end thereof to said CPU and with another end thereof to a PWM converting circuit;

said AC driving circuit connected with one end thereof to said CPU and with another end thereof to said DC/AC inverting circuit;

a voltage regulation circuit provided for power supplying for normal operation of said circuitry of said power inverter;

said PWM converting circuit connected with one end thereof to said PWM driving circuit and with another end thereof to said rectifying circuit;

said rectifying circuit connected with one end thereof to said PWM converting circuit and with another end thereof to said DC/AC inverting circuit, and having a high voltage AC output connecting point;

said DC/AC inverting circuit connected to said AC driving circuit and said rectifying circuit and to said overload detecting circuit, and further having an AC output connecting point;

wherein, said CPU controls by cooperation the working of said overload detecting circuit, it turns off output in time before the output power makes the elements of said power inverter crumbled, a short time after restoration, said CPU turns on output again; the process is repeated again and again intermittently to protect said elements from being damaged, and the normal working power for a machine load is afforded, the larger actuating power for said machine is provided.

2. The digital electric power inverter as in claim 1, wherein:

said overload detecting circuit is comprised of an operation amplifier (OPA), a plurality of diodes, resistances and capacitors, and is provided for detecting whether it is overloading and whether the input DC voltage is overly high or overly low;

said CPU includes a transistor, a plurality of resistances and capacitors, a diode, an operation amplifier (OPA) and an LED, in order to provide signals for said PWM driving circuit and said AC driving circuit;

said high voltage detecting circuit is comprised of a plurality of transistors, Zener diodes, resistances, a variable resistance and a plurality of capacitors;

said alarm circuit is comprised of a transistor, a plurality of diodes and resistances, and a buzzer, and is provided for detecting an abnormal state of said circuitry to provide an alarm;

said PWM driving circuit is comprised of a plurality of transistors, diodes, resistances and capacitors, and is provided for applying and reshaping the output PWM signals output from said CPU;

said AC driving circuit is comprised of a plurality of transistors and resistances, and is provided for amplifying the output AC driving signals of said CPU;

said voltage regulation circuit is comprised of a voltage regulation IC, a plurality of diodes and capacitors;

said PWM converting circuit is comprised of a plurality of FET power transistors, resistances, capacitors and two transformers, and is directly supplied with electric power in the mode of DC inputting, and is provided for increasing the voltage of the driving signals amplified and reshaped by said PWM driving circuit through said transformers to generate high frequency AC signals;

said rectifying circuit is comprised of a plurality of diodes capacitors and resistances, and is provided for rectifying the high frequency AC signals generated by said PWM converting circuit to generate an AC high voltage, and is directly supplied with electric power in the mode of DC inputting;

said DC/AC inverting circuit is comprised of a plurality of transistors, FET power transistors, diodes, Zener diodes, resistances, capacitors and a heat sensitive resistance, is connected to receive a DC input, and is provided for converting DC high voltage signals provided by said AC driving circuit into an AC high voltage output.

* * * * *